United States Patent
Sohn et al.

(10) Patent No.: US 12,341,154 B2
(45) Date of Patent: Jun. 24, 2025

(54) SULFIDE SOLID ELECTROLYTE FOR ALL-SOLID SECONDARY BATTERY, METHOD OF PREPARING THE SAME, AND ALL-SOLID SECONDARY BATTERY INCLUDING THE SAME

(71) Applicant: SAMSUNG SDI CO., LTD., Yongin-si (KR)

(72) Inventors: Dongrak Sohn, Yongin-si (KR); Jungmin Han, Yongin-si (KR); Keesun Sohn, Seoul (KR); Sunggeun Shim, Seoul (KR); Minsang Song, Yongin-si (KR); Minjin Song, Yongin-si (KR); Kyulin Lee, Yongin-si (KR); Jeongdoo Yi, Yongin-si (KR); Younggyoon Ryu, Yongin-si (KR); Yunchae Jung, Yongin-si (KR); Sangil Han, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 450 days.

(21) Appl. No.: 17/856,008

(22) Filed: Jul. 1, 2022

(65) Prior Publication Data
US 2023/0019090 A1    Jan. 19, 2023

(30) Foreign Application Priority Data
Jul. 2, 2021  (KR) ........................ 10-2021-0087396

(51) Int. Cl.
*H01M 10/0562* (2010.01)
*H01M 10/0525* (2010.01)

(52) U.S. Cl.
CPC .............. *H01M 10/0562* (2013.01); *H01M 10/0525* (2013.01); *H01M 2300/008* (2013.01)

(58) Field of Classification Search
CPC ......... H01M 10/0562; H01M 10/0525; H01M 2300/008; H01M 4/5815; Y02E 60/10
(Continued)

(56) References Cited

U.S. PATENT DOCUMENTS 8,075,865 B2    12/2011   Deiseroth et al.
9,899,702 B2    2/2018    Miyashita et al.
(Continued)

FOREIGN PATENT DOCUMENTS

CN      111430688 A     7/2020
JP      2016-167457 A   9/2016
(Continued)

OTHER PUBLICATIONS

WO 2020038960 A1 and Corresponding US 20210323824 A1 (Year: 2020).*
(Continued)

*Primary Examiner* — Ekandra S. Miller-Cruz
*Assistant Examiner* — Kevin Nguyen
(74) *Attorney, Agent, or Firm* — Lee IP Law, P.C.

(57) ABSTRACT

A sulfide solid electrolyte for an all-solid secondary battery includes lithium, phosphorus, sulfur, oxygen, and halogen atoms, wherein the sulfide solid electrolyte has an argyrodite-type crystal structure, the halogen atoms includes chlorine and at least two of bromine, iodine, and fluorine, an atomic ratio of sulfur to oxygen in the sulfide solid electrolyte is about 4 or higher, and an atomic ratio of chlorine to the at least two of bromine, iodine, and fluorine is about 9 or higher.

17 Claims, 9 Drawing Sheets

(58) Field of Classification Search
USPC .......................................................... 429/323
See application file for complete search history.

(56) References Cited

U.S. PATENT DOCUMENTS

| | | |
|---|---|---|
| 10,879,561 B2 | 12/2020 | Utsuno et al. |
| 10,879,562 B2 | 12/2020 | Kim et al. |
| 11,196,083 B2 | 12/2021 | Takahashi et al. |
| 11,264,642 B2 | 3/2022 | Utsuno et al. |
| 2018/0069262 A1 | 3/2018 | Utsuno et al. |
| 2019/0148769 A1 | 5/2019 | Aihara et al. |
| 2019/0173120 A1 | 6/2019 | Rupert et al. |
| 2019/0198917 A1 | 6/2019 | Seong et al. |
| 2020/0127325 A1 | 4/2020 | Takahashi et al. |
| 2021/0323824 A1* | 10/2021 | Nazar ............... H01M 10/0562 |
| 2022/0109183 A1 | 4/2022 | Takahashi et al. |
| 2022/0131183 A1 | 4/2022 | Takahashi et al. |
| 2022/0344703 A1 | 10/2022 | Kimpara et al. |
| 2023/0132005 A1 | 4/2023 | Nassoy et al. |

FOREIGN PATENT DOCUMENTS

| | | |
|---|---|---|
| JP | 2018-29058 A | 2/2018 |
| JP | 6595152 B2 | 10/2019 |
| JP | 6679730 B2 | 3/2022 |
| KR | 10-1952196 B1 | 2/2019 |
| KR | 10-2019-0058467 A | 5/2019 |
| KR | 10-2020-0003929 A | 1/2020 |
| WO | WO 2020/038960 A1 | 2/2020 |
| WO | WO 2021/049414 A1 | 3/2021 |
| WO | WO 2021-049415 A1 | 3/2021 |
| WO | WO 2021/054433 A1 | 3/2021 |

OTHER PUBLICATIONS

Extended European Search Report issued Nov. 8, 2022 for corresponding EP Patent Application No. 22182503.7.
Japanese Notice of Allowance dated Dec. 11, 2023, of the corresponding JP Patent Application No. 2022-107786.
Japanese Office Action issued Jun. 19, 2023, for corresponding Japanese Patent Application No. 2022-107786.

* cited by examiner

SULFIDE SOLID ELECTROLYTE FOR ALL-SOLID SECONDARY BATTERY, METHOD OF PREPARING THE SAME, AND ALL-SOLID SECONDARY BATTERY INCLUDING THE SAME

CROSS-REFERENCE TO RELATED APPLICATION

This application is based on and claims priority under 35 U.S.C. § 119 to Korean Patent Application No. 10-2021-0087396, filed on Jul. 2, 2021, in the Korean Intellectual Property Office, the disclosure of which is incorporated by reference herein in its entirety.

BACKGROUND

1. Field

One or more embodiments relate to a sulfide solid electrolyte for an all-solid secondary battery, a method of preparing the sulfide solid electrolyte, and an all-solid secondary battery including the sulfide solid electrolyte.

2. Description of the Related Art

In recent years, batteries having improved energy density and safety have been actively developed in accordance with industrial demand. For example, lithium-ion batteries have been put to practical use in the automotive industry as well as in information-related equipment and communication equipment. In the automotive industry, safety is particularly important due to its relation to life.

Lithium-ion batteries which are currently commercialized use an electrolytic solution including a flammable organic dispersion medium, and thus there is a possibility of overheating and fire when a short-circuit occurs. As a result, an all-solid secondary battery using a solid electrolyte instead of an electrolytic solution has been proposed. Since an all-solid secondary battery does not use a flammable organic dispersion medium, the possibility of fire or an explosion may be greatly reduced even when a short-circuit occurs. Therefore, such an all-solid secondary battery may greatly enhance safety as compared with a lithium-ion battery using an electrolytic solution.

SUMMARY

According to one or more embodiments, a sulfide solid electrolyte for an all-solid secondary battery may include lithium, sulfur, oxygen, and halogen atoms and has an argyrodite-type crystal structure, wherein the halogen atoms include i) chlorine and ii) at least two selected from bromine, iodine, and fluorine, an atomic ratio of sulfur (S) to oxygen (O) (S/O) in the sulfide solid electrolyte is about 4 or higher, and an atomic ratio of chlorine (Cl) to the at least two selected from bromine, iodine, and fluorine (X) (Cl/X) is about 9 or higher.

According to one or more embodiments, an all-solid secondary battery may include a cathode layer; an anode layer; and a solid electrolyte layer disposed between the cathode layer and the anode layer, wherein at least one selected from the cathode layer and the solid electrolyte layer includes the sulfide solid electrolyte according to an embodiment.

According to one or more embodiments, a method of preparing a sulfide solid electrolyte may include contacting a precursor mixture prepared by mixing at least two precursors including lithium, sulfur (S), phosphorus (P), oxygen, and halogen atoms, which are precursors for forming a sulfide solid electrolyte; and heat-treating the precursor mixture at a temperature of about 350° C. or higher.

BRIEF DESCRIPTION OF THE DRAWINGS

Features will become apparent to those of skill in the art by describing in detail exemplary embodiments with reference to the attached drawings, in which.

DETAILED DESCRIPTION

Figure 1:
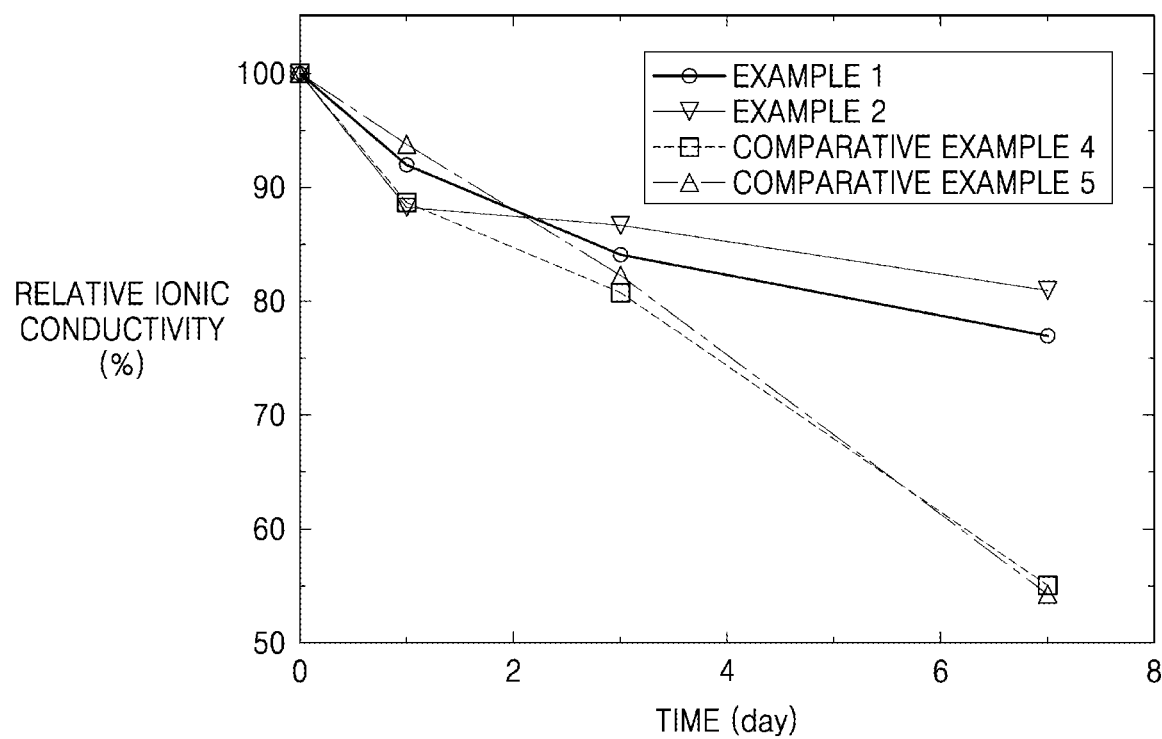
FIG. 1 shows relative ionic conductivity change of sulfide solid electrolytes prepared in Examples 1 and 2 and Comparative Examples 4 and 5 according to time.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

As used herein, the term "and/or" includes any and all combinations of one or more of the associated listed items. Expressions such as "at least one of," when preceding a list of elements, modify the entire list of elements and do not modify the individual elements of the list.

Hereinafter, a sulfide solid electrolyte for an all-solid secondary battery according to one or more embodiments, an all-solid secondary battery including the sulfide solid electrolyte, and a method of preparing the sulfide solid electrolyte will be described in detail.

According to an embodiment, a sulfide solid electrolyte for an all-solid secondary battery includes lithium, phosphorus, sulfur, oxygen, and halogen atoms, and has an argyrodite-type crystal structure, wherein the halogen atoms include i) chlorine and ii) at least two selected from bromine, iodine, and fluorine. An atomic ratio of sulfur to oxygen in the sulfide solid electrolyte is about 4 or higher, and an atomic ratio of chlorine to the at least two selected from bromine, iodine, and fluorine is about 9 or higher.

An argyrodite-type sulfide solid electrolyte may be used as a solid electrolyte of an all-solid secondary battery. However, the sulfide solid electrolyte may not have sufficient stability in a moist environment, thereby reducing the structural stability and ionic conductivity thereof, as well as rendering a large-area and mass production of all-solid secondary batteries difficult.

In contrast, example embodiments provide an argyrodite-type sulfide solid electrolyte, in which structural stability and moisture stability are improved by substitution of some of sulfur with oxygen, and ionic conductivity is improved by controlling an amount of iodine to a predetermined range while containing three types of halogen atoms.

According to example embodiments, the sulfide solid electrolyte includes lithium (Li), phosphorus (P), sulfur (S), oxygen (O), and three types of halogen atoms, and has an argyrodite-type crystal structure. The three types of halogen atoms include chlorine (Cl), bromine (Br), and iodine (I). Here, the argyrodite-type crystal structure is a structure in which a $PS_4^3$-structure is a main unit structure of the skeleton and a site in the vicinity of this structure is occupied by three types of halogen atoms (Cl, Br, and I) and S surrounded by Li.

An atomic ratio R1 of the chlorine to the phosphorus (Cl/P), an atomic ratio R2 of the bromine to the phosphorus (Br/P), and an atomic ratio R3 of the iodine to the phosphorus (I/P) satisfy Equation 1:

$$1.3 \leq R1+R2+R3 \leq 1.8 \quad \text{Equation 1}$$

In the sulfide solid electrolyte according to an embodiment, the atomic ratio R1 of the chlorine to the phosphorus (Cl/P), the atomic ratio R2 of the bromine to the phosphorus (Br/P), and the atomic ratio R3 of the iodine to the phosphorus (I/P) satisfy Equations 2 to 4, respectively:

$$1.3 \leq R1 \leq 1.5 \quad \text{Equation 2}$$

$$0 \leq R2 \leq 0.2 \quad \text{Equation 3}$$

$$0 \leq R3 \leq 0.05 \quad \text{Equation 4}$$

An atomic ratio R4 of the lithium to the phosphorus (Li/P) and an atomic ratio R5 of the lithium to the sulfur (Li/S) satisfy Equations 5 and 6, respectively:

$$5.4 \leq R4 \leq 5.7 \quad \text{Equation 5}$$

$$1.3 \leq R5 \leq 1.55 \quad \text{Equation 6}$$

In the sulfide solid electrolyte, amounts of lithium, phosphorus, and sulfur may be evaluated through inductively coupled plasma (ICP) analysis. Also, the amounts of the halogen atoms may be evaluated by ion chromatography. When these conditions are satisfied, an all-solid secondary battery having a high energy density may be prepared.

A lattice parameter of an argyrodite-type crystal structure in the sulfide solid electrolyte according to an embodiment may be greater than about 9.800 angstroms and less than about 9.880 angstroms, e.g., about 9.830 angstroms to about 9.835 angstroms or about 9.832 angstroms to about 9.834 angstroms. The lattice parameter of the argyrodite-type crystal structure within these ranges refer to large amounts of chlorine, bromine, and iodine in the crystal structure. When a material of the corresponding composition has a lattice parameter outside of these ranges by addition of bromine and iodine, which have large ionic radii, the material of the corresponding composition may not form an argyrodite-type crystal structure.

In the sulfide solid electrolyte according to an embodiment, when the lattice parameter of the argyrodite-type crystal structure is less than about 9.800 Å, bromine and iodine, which have relatively large ionic radii, may not be substituted. When the lattice parameter is greater than about 9.880 Å, bromine and iodine, which have radii larger than that of chlorine, are excessively substituted compared to the optimum amounts, and thus, ionic conductivity of the material may be partially lowered.

The lattice parameter of the argyrodite-type crystal structure with respect to the sulfide solid electrolyte may be obtained by analyzing the whole pattern fitting (WPF) using a crystal structure analysis software from the X-ray diffraction (XRD) pattern obtained by the XRD measurement.

An amount (e.g., wt % or atomic %) of oxygen in the sulfide solid electrolyte according to an embodiment may be about 20% or less, about 5% to about 20%, about 8% to about 15%, or about 9% to about 11%, based on the total amount of oxygen and sulfur. When the amount of oxygen is within these ranges, some of lithium-sulfur bonds are substituted with lithium-oxygen bonds of a stronger bonding force due to introduction of oxygen having a higher electronegativity than that of sulfur in the crystal structure. This strong bond contributes to improvement of structural stability and moisture stability.

A total amount of the halogen atoms in the sulfide solid electrolyte is about 20 atom % or less, based on the total amount of the sulfide solid electrolyte. In detail, an amount of chlorine may be about 80 atom % to less than about 100 atom %, e.g., about 87 atom % to about 93 atom %, based on the total amount of the three halogen atoms. An amount of bromine may be in about 20 atom % or less, about 5 atom % to about 15 atom %, or about 7 atom % to about 9 atom %, based on the total amount of the three halogen atoms. Also, an amount of iodine may be about 3 atom % or less, about 2 atom % or less, or about 0.5 atom % to about 1.5 atom %, based on the total amount of the three halogen atoms.

The sulfide solid electrolyte according to an embodiment is a compound represented by Formula 1.

$$Li_a P_b S_b O_c Ha_d \quad \text{Formula 1}$$

In Formula 1, $5.4 < a < 5.6$, $4.4 < (b+c) < 4.6$, $0 < c/(c+b) < 0.2$, and $1.4 < d < 1.6$, and $Ha_d$ is a halogen element represented by Formula 2, below, where $1.3 < e < 1.5$, $0 < f < 0.2$, and $0 < g < 0.05$.

$$Cl_e Br_f I_g \quad \text{Formula 2}$$

In Formula 1, a may be about 5.410 to about 5.590, about 5.450 to about 5.580, or about 5.510 to about 5.570. Also, b may be in a range of about 3 to about 5, about 3 to about 4.500, or about 3.500 to about 4.2, and c may be in a range of about 0.3 to about 0.950, about 0.4 to about 0.950, or about 0.450 to about 0.900.

In Formula 2, e may be in a rage of about 1.350 to about 1.410 or about 1.395 to about 1.4100, f may be in a range of about 0.010 to about 0.3, about 0.010 to about 0.2, about 0.120 to about 0.130, or about 0.125 to about 0.129, and g may be in a range of about 0.001 to about 0.03, about 0.005 to about 0.025, or about 0.01 to about 0.02.

For example, the compound of Formula 1 may be a compound represented by Formula 3, $$Li_aPS_bO_cCl_{e1}Br_{f1}I_{g1}$$ Formula 3

In Formula 3, $5.4 < a < 5.6$, $3.6 < b < 4.6$, $0 < c < 1.0$, $1.35 < e1 < 1.45$, $0.1 < f1 < 0.15$, $0 < g1 < 0.02$, and $1.4 < e1+f1+g1 < 1.6$. In Formula 3, a may be in a range of about 5.410 to about 5.590, about 5.450 to about 5.580, or about 5.510 to about 5.570. Also, b may be in a range of about 3 to about 5, about 3 to about 4.500, or about 3.500 to about 4.2, and c may be in a range of about 0.3 to about 0.950, about 0.4 to about 0.950, or about 0.450 to about 0.900. In Formula 3, e1 may be in a rage of about 1.350 to about 1.410 or about 1.395 to about 1.4100, f1 may be in a range of about 0.010 to about 0.3, about 0.010 to about 0.2, about 0.120 to about 0.130, or about 0.125 to about 0.129, and g may be in a range of about 0.001 to about 0.03, about 0.005 to about 0.025, or about 0.01 to about 0.02.

For example, the compound represented by Formula 3 may be $Li_{5.57}P_1S_{4.06}O_{0.45}Cl_{1.40}Br_{0.13}I_{0.01}$, $Li_{5.57}PS_{3.62}O_{0.90}Cl_{1.40}Br_{0.13}I_{0.01}$, $Li_{5.57}PS_{4.06}O_{0.45}Cl_{1.40}Br_{0.13}I_{0.02}$, $Li_{5.57}P_1S_{3.62}O_{0.90}Cl_{1.40}Br_{0.13}I_{0.02}$, $Li_{5.7}P_1S_{4.06}O_{0.45}Cl_{1.40}Br_{0.13}I_{0.01}$, $Li_{5.7}P_1S_{4.06}O_{0.45}Cl_{1.40}Br_{0.13}I_{0.01}$, or a combination thereof.

An ionic conductivity at 25° C. of the sulfide solid electrolyte according to an embodiment may be about 2 mS/cm or greater or in a range of about 2.3 mS/cm to about 5 mS/cm. Also, the sulfide solid electrolyte has an ionic conductivity retention rate of about 70% or higher 7 days after exposure to a dry room (dew point of −45° C.), and the ionic conductivity retention rate is obtained according to Equation 7.

Ion conductivity retention rate={(ionic conductivity of sulfide solid electrolyte 1, 3, or 7 days after exposure to dry room)/(ionic conductivity before exposure to dry room)}×100    Equation 7

The all-solid secondary battery according to one or more embodiments includes a cathode layer; an anode layer; and a solid electrolyte layer disposed between the cathode layer and the anode layer, wherein at least one of the cathode layer and the solid electrolyte layer contains the sulfide solid electrolyte according to an embodiment.

[All-Solid Secondary Battery]

Figure 7:
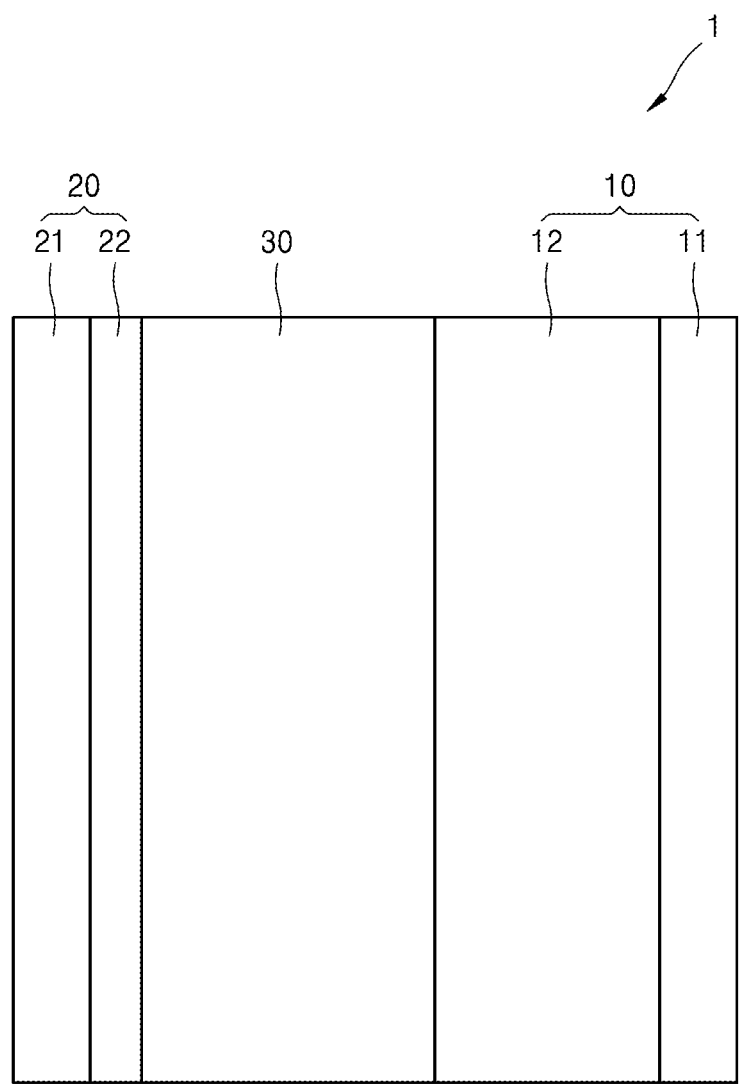
FIG. 7 is a schematic view of a structure of an all-solid secondary battery according to an embodiment.

Referring to FIG. 7, an all-solid secondary battery 1 may include a cathode layer 10; an anode layer 20; and a solid electrolyte disposed between the cathode layer 10 and the anode layer 20.

The cathode layer 10 may include a cathode current collector 11 and a cathode active material layer 12 disposed on the cathode current collector 11. The cathode active material layer 12 may include a cathode active material, a binder, and a solid electrolyte. Also, the anode layer 20 may include an anode current collector 21 and an anode active material layer 22 disposed on the anode current collector 21.

The solid electrolyte of the cathode layer 10 may include the sulfide solid electrolyte according to an embodiment. Also, the solid electrolyte layer 30 may include a solid electrolyte. Here, the solid electrolyte of the solid electrolyte layer 30 may include the sulfide solid electrolyte according to an embodiment.

[Cathode Layer: Cathode Current Collector]

The cathode current collector 11 may be a plate or a foil formed of, e.g., indium (In), copper (Cu), magnesium (Mg), stainless steel, titanium (Ti), iron (Fe), cobalt (Co), nickel (Ni), zinc (Zn), aluminum (Al), germanium (Ge), lithium (Li), or an alloy thereof. The cathode current collector 11 may be omitted.

The cathode current collector 11 may further include a carbon layer disposed on one or both surfaces of a metal substrate. The additional placement of the carbon layer on the metal substrate may prevent or substantially reduce corrosion of a metal of the metal substrate due to a solid electrolyte included in the cathode layer 10, and may reduce the interfacial resistance between the cathode active material layer 12 and the cathode current collector 11. The carbon layer may have a thickness of, e.g., about 1 μm to about 5 μm. When the carbon layer is too thin in thickness, e.g., less than about 1 μm, it may be hard to completely block (or substantially reduce) contact between the metal substrate and the solid electrolyte. When the carbon layer is too thick in thickness, e.g., above about 5 μm, the all-solid secondary battery may have a reduced energy density. The carbon layer may include amorphous carbon or crystalline carbon.

[Cathode Layer: Cathode Active Material]

The cathode active material layer 12 may be coated on at least a portion of the cathode current collector 11. The cathode active material layer 12 may include, e.g., a cathode active material, a solid electrolyte, a binder, and a solvent.

The cathode active material layer 12 may include a conducting agent. The conducting agent may be, e.g., at least one of graphite, carbon black, acetylene black, carbon nanofiber, or carbon nanotube.

The solid electrolyte included in the cathode layer 10 may be similar to or different from the solid electrolyte included in the solid electrolyte layer 30. Details about the solid electrolyte of the cathode layer 10 may be the same as those described in relation to the solid electrolyte layer 30.

The cathode active material of the cathode active material layer 12 may be a cathode active material capable of reversibly absorbing and desorbing lithium ions. For example, the cathode active material may include a lithium transition metal oxide (e.g., lithium cobalt oxide (LCO), lithium nickel oxide, lithium nickel cobalt oxide, lithium nickel cobalt aluminum oxide (NCA), lithium nickel cobalt manganese oxide (NCM), lithium manganate, and lithium iron phosphate), nickel sulfide, copper sulfide, lithium sulfide, iron oxide, or vanadium oxide. The cathode active material may be used alone or in a mixture of at least two selected from these examples.

For example, the lithium transition metal oxide may be a compound represented by one of the following formulae: $Li_aA_{1-b}B'_bD'_2$ (where $0.90 \leq a \leq 1$, and $0 \leq b \leq 0.5$); $Li_aE_{1-b}B'_bO_{2-c}D'_c$ (where $0.90 \leq a \leq 1$, $0 \leq b \leq 0.5$, and $0 \leq c \leq 0.05$); $LiE_{2-b}B'_bO_{4-c}D'_c$ (where $0 \leq b \leq 0.5$, and $0 \leq c \leq 0.05$); $Li_aNi_{1-b-c}Co_bB'_cD'_\alpha$ (where $0.90 \leq a \leq 1$, $0 \leq b \leq 0.5$, $0 \leq c \leq 0.05$, and $0 < \alpha \leq 2$); $Li_aNi_{1-b-c}Co_bB'_cO_{2-\alpha}F'_\alpha$ (where $0.90 \leq a \leq 1$, $0 \leq b \leq 0.5$, $0 \leq c \leq 0.05$, and $0 < \alpha < 2$); $Li_aNi_{1-b-c}Co_bB'_cO_{2-\alpha}F'_2$ (where $0.90 \leq a \leq 1$, $0 \leq b \leq 0.5$, $0 \leq c \leq 0.05$, and $0 < \alpha < 2$); $Li_aNi_{1-b-c}Mn_bB'_cD'_\alpha$ (where $0.90 \leq a \leq 1$, $0 \leq b \leq 0.5$, $0 \leq c \leq 0.05$, and $0 < \alpha \leq 2$); $Li_aNi_{1-b-c}Mn_bB'_cO_{2-\alpha}F'_\alpha$ (where $0.90 \leq a \leq 1$, $0 \leq b \leq 0.5$, $0 \leq c \leq 0.05$, and $0 < \alpha \leq 2$); $Li_aNi_{1-b-c}Mn_bB'_cO_{2-\alpha}F'_2$ (where $0.90 \leq a \leq 1$, $0 \leq b \leq 0.5$, $0 \leq c \leq 0.05$, and $0 < \alpha \leq 2$); $Li_aNi_bE_cG_dO_2$ (where $0.90 \leq a \leq 1$, $0 \leq b \leq 0.9$, $0 \leq c \leq 0.5$, and $0.001 \leq d \leq 0.1$); $Li_aNi_bCo_cMn_dG_eO_2$ (where $0.90 \leq a \leq 1$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1$, and $0.001 \leq b \leq 0.1$); $Li_aCoG_bO_2$ (where $0.90 \leq a \leq 1$, and $0.001 \leq b \leq 0.1$); $Li_aMnG_bO_2$ (where $0.90 \leq a \leq 1$, and $0.001 \leq b \leq 0.1$); $Li_aMn_2GbO_4$ (where $0.90 \leq a \leq 1$, $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (where $0 \leq f \leq 2$); $Li_{(3-f)}Fe_2(PO_4)_3$ (where $0 \leq f \leq 2$); and $LiFePO_4$. In the compound, A may be nickel (Ni), cobalt (Co), manganese (Mn), or a combination thereof; B' may be aluminum (Al), nickel (Ni), cobalt (Co), manganese (Mn), chromium (Cr), iron (Fe), magnesium (Mg), strontium (Sr), vanadium (V), a rare earth element, or a combination thereof; D' may be oxygen (O), fluorine (F), sulfur (S), phosphorus (P), or a combination thereof; E may be cobalt (Co), manganese (Mn), or a combination thereof; F' may be fluorine (F), sulfur (S), phosphorus (P), or a combination thereof; G may be aluminum (Al), chromium (Cr), manganese (Mn), iron (Fe), magnesium (Mg), lanthanum (La), cerium (Ce), strontium (Sr), vanadium (V), or a combination thereof; Q may be titanium (Ti), molybdenum (Mo), manganese (Mn), or a combination thereof; I' may be chromium (Cr), vanadium (V), iron (Fe), scandium (Sc), yttrium (Y), or a combination thereof; and J may be vanadium (V), chromium (Cr), manganese (Mn), cobalt (Co), nickel (Ni), copper (Cu), or a combination thereof.

For example, the compound of the lithium transition metal oxide may have a surface coating layer (hereinafter, also referred to as "coating layer"). In another example, a mixture of a compound without a coating layer and a compound having a coating layer (both compounds being from the compounds listed above) may be used. In some embodiments, the coating layer may include at least one compound of a coating element and one of, e.g., oxide, hydroxide, oxyhydroxide, oxycarbonate, and hydroxycarbonate, of the coating element. In some embodiments, the compounds for the coating layer may be amorphous or crystalline. In some embodiments, the coating element for the coating layer may be, e.g., magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a mixture thereof. In some embodiments, the coating layer may be formed using any suitable method that does not adversely affect the physical properties of the cathode active material when a compound of the coating element is used. For example, the coating layer may be formed using a spray coating method or a dipping method.

The cathode active material of the cathode active material layer 12 may include, for example, a lithium salt of a transition metal oxide that has a layered rock-salt type structure among the examples of the lithium transition metal oxide. For example, the "layered rock-salt type structure" refers to a structure in which an oxygen atom layer and a metal atom layer are alternately and regularly arranged in a<111> direction in a cubic rock-salt type structure, where each of the atom layers forms a two-dimensional flat plane. The "cubic rock-salt type structure" refers to a sodium chloride (NaCl) type structure, which is one of the crystalline structures, in particular, to a structure in which face-centered cubic (fcc) lattices respectively formed of anions and cations are shifted by only a half of the ridge of each unit lattice. Examples of the lithium transition metal oxide having the layered rock-salt type structure may include a ternary lithium transition metal oxide expressed as $LiNi_xCo_yAl_zO_2$ (NCA) or $LiNi_xCo_yMn_zO_2$ (NCM) (where $0<x<1$, $0<y<1$, $0<z<1$, and $x+y+z=1$). When the cathode active material includes a ternary transition metal oxide having the layered rock-salt type structure, the energy density and thermal stability of the all-solid secondary battery may be improved.

The cathode active material may be covered by a coating layer as described above. The coating layer is any material that may be used as a coating layer of a cathode active material of an all-solid secondary battery, e.g., $Li_2O$—$ZrO_2$ (LZO).

When the cathode active material includes nickel (Ni) as a ternary lithium transition metal oxide such as NCA or NCM, a capacity density of the all-solid secondary battery 1 increases, and thus, metal elution from the cathode active material in a charged state may be reduced. As a result, the all-solid secondary battery 1 according to an embodiment may have improved cycle characteristics in a charged state.

For example, a shape of the cathode active material may be particle shapes such as a spherical shape, an elliptical shape, etc. A particle diameter of the cathode active material may be in a range applicable to a cathode active material of an all-solid secondary battery. An amount of the cathode active material of the cathode layer 10 may be in a range applicable to a cathode layer of an all-solid secondary battery.

[Cathode Layer: Solid Electrolyte]

The cathode active material layer 12 may include, e.g., a solid electrolyte. The cathode active material layer 12 may include the sulfide solid electrolyte according to an embodiment.

The solid electrolyte included in the cathode layer 10 may be identical to or different from the solid electrolyte included in the solid electrolyte 30. Details about the solid electrolyte of the cathode layer 10 may be the same as those described in relation to the solid electrolyte layer 30.

The solid electrolyte in the cathode active material layer 12 may have $D_{50}$ (a median particle diameter) that is smaller than that of the solid electrolyte in the solid electrolyte layer 30. For example, $D_{50}$ (a median particle diameter) of the solid electrolyte in the cathode active material layer 12 may be about 90% or less, about 80% or less, about 70% or less, about 60% or less, about 50% or less, about 40% or less, about 30% or less, or about 20% or less of $D_{50}$ (a median particle diameter) of the solid electrolyte in the solid electrolyte layer 30.

[Cathode Layer: Binder]

The cathode active material layer 12 may include a binder. Examples of the binder may include polyvinylidene fluoride, styrene butadiene rubber (SBR), polytetrafluoroethylene, a vinylidene fluoride/hexafluoropropylene copolymer, polyacrylonitrile, and polymethylmethacrylate.

[Cathode Layer: Conducting Agent]

The cathode active material layer 12 may include a conducting agent. Examples of the conducting agent may include graphite, carbon black, acetylene black, ketjen black, carbon fiber, or metal powder.

[Cathode Layer: Other Additives]

For example, the cathode layer 10 may further include additives, e.g., a filler, a coating agent, a dispersant, and an ion conducting agent in addition to the cathode active material, solid electrolyte, binder, and ionic conducting agent. Any suitable filler, coating agent, dispersant, and ionic conducting agent may be used.

[Solid Electrolyte Layer]

The solid electrolyte in the solid electrolyte layer 30 may be the sulfide solid electrolyte according to an embodiment.

[Solid Electrolyte Layer: Sulfide Solid Electrolyte]

Figure 8:
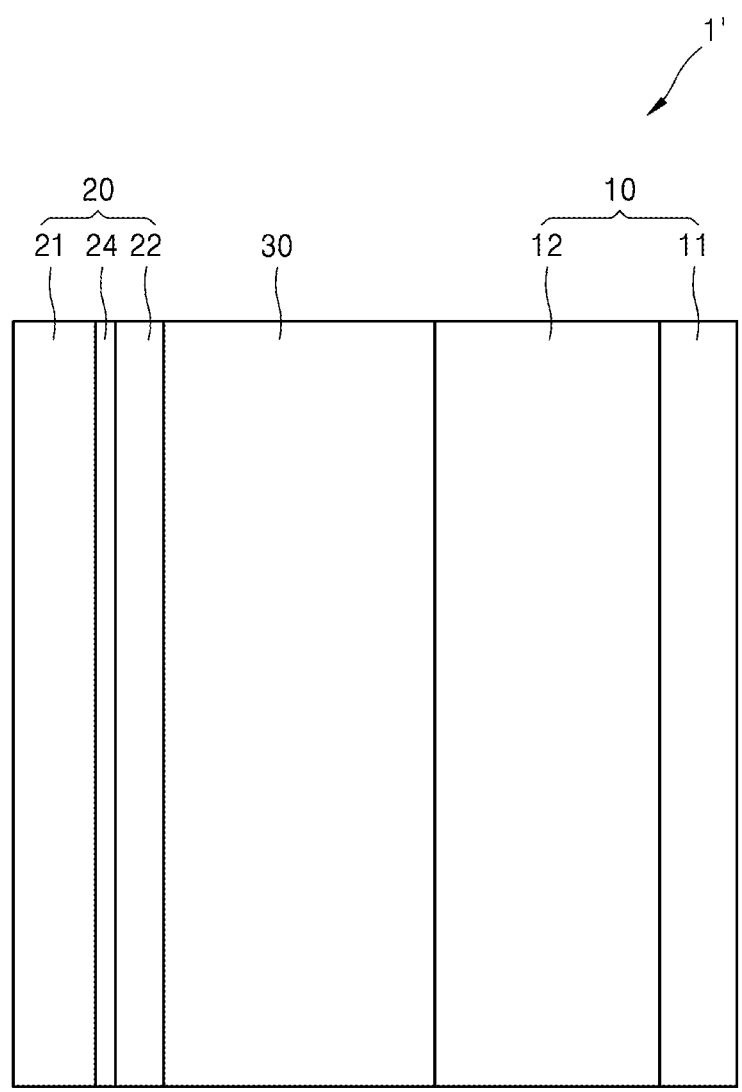
FIG. 8 is a schematic view of a structure of an all-solid secondary battery according to another embodiment.

Referring to FIGS. 7 and 8, the solid electrolyte layer 30 may be between the cathode layer 10 and the anode layer 20, and may include the sulfide solid electrolyte according to an embodiment, a commercially available sulfide solid electrolyte, or a combination thereof.

In the all-solid secondary battery according to one or more embodiments, the solid electrolyte layer 30 including the sulfide solid electrolyte according to an embodiment may include a commercially available sulfide solid electrolyte. The commercially available sulfide may be, e.g., at least one of $Li_2S$—$P_2S_5$, $Li_2S$—$P_2S_5$—LiX (where X is a halogen), $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (where m, n are each independently a positive integer, and Z is one of Ge, Zn, and Ga), $Li_2S$—$GeS_2$, $Li_2S$—$SiS_2$—$Li_3PO_4$, $Li_2S$—$SiS_2$-$Li_pMO_q$ (where p and q are each independently a positive integer, and M is one of P, Si, Ge, B, Al, Ga, and In), $Li_{7-x}PS_{6-x}Cl_x$ (where $0 \leq x \leq 2$), $Li_{7-x}PS_{6-x}Br_x$ (where $0 \leq x \leq 2$), and $Li_{7-x}PS_{6-x}I_x$ (where $0 \leq x \leq 2$).

The sulfide solid electrolyte may be prepared by melting and quenching starting materials (e.g., $Li_2S$ or $P_2S_5$), or mechanically milling the starting materials. Subsequently, the resultant may be heat-treated. The sulfide solid electrolyte may be amorphous, crystalline, or a mixed form thereof. Also, the sulfide solid electrolyte may include at least sulfur (S), phosphorus (P), and lithium (Li), as component elements among the sulfide solid electrolyte materials. For example, the sulfide solid electrolyte may be a material including $Li_2S$—$P_2S_5$. When $Li_2S$—$P_2S_5$ is used as a sulfide solid electrolyte material, a mixing molar ratio of $Li_2S$ and $P_2S_5$ ($Li_2S$:$P_2S_5$) may be, e.g., in a range of about 50:50 to about 90:10.

For example, the sulfide solid electrolyte may be argyrodite-type compound including at least one of $Li_{7-x}PS_{6-x}Cl_x$ (where $0 \leq x \leq 2$), $Li_{7-x}PS_{6-x}Br_x$ (where $0 \leq x \leq 2$), and $Li_{7-x}PS_{6-x}I_x$ (where $0 \leq x \leq 2$). Particularly, the sulfide solid electrolyte may be, e.g., an argyrodite-type compound including at least one of $Li_6PS_5Cl$, $Li_6PS_5Br$, and $Li_6PS_5I$.

A density of the sulfide solid electrolyte may be in a range of about 1.25 g/cc to about 1.75 g/cc. When the sulfide solid electrolyte has a density within this range, internal resistance of an all-solid secondary battery may decrease, and thus, penetration of the solid electrolyte by Li ions may be effectively suppressed.

[Solid Electrolyte Layer: Binder]

For example, the solid electrolyte layer 30 may include a binder. Examples of the binder included in the solid electrolyte layer 30 may include styrene butadiene rubber (SBR), polytetrafluoroethylene, polyvinylidene fluoride, or polyethylene. The binder of the solid electrolyte layer 30 may be identical to or different from binders of the cathode active material layer 12 and the anode active material layer 22.

[Anode Layer]

[Anode Layer: Anode Active Material]

The anode layer 20 may include an anode current collector 21 and a first anode active material layer 22 disposed on the anode current collector 21. The first anode active material layer 22 may include, e.g., an anode active material and a binder.

The anode active material may include, e.g., at least one of a carbonaceous anode active material, a metal or a metalloid anode active material, and a lithium metal.

In some embodiments, the carbonaceous anode active material may be amorphous carbon. Examples of the amorphous carbon may include carbon black (CB), acetylene black (AB), furnace black (FB), ketjen black (KB), and graphene. The amorphous carbon may be carbon without crystallinity or with very low crystallinity, and is distinguished from crystalline carbon or graphene-based carbon.

The metal or metalloid anode active material may include gold (Au), platinum (Pt), palladium (Pd), silicon (Si), silver (Ag), aluminum (Al), bismuth (Bi), tin (Sn), zinc (Zn), or a combination thereof, but embodiments are not limited thereto, and any metal anode active material or metalloid anode active material capable of forming an alloy or compound with lithium may be used. For example, nickel (Ni), which does not form an alloy with lithium, may not be used as the metal anode active material.

The first anode active material layer 22 may include one anode active material, or may include a mixture of different anode active materials. For example, the first anode active material layer 22 may only include amorphous carbon or may include at least one selected of gold (Au), platinum (Pt), palladium (Pd), silicon (Si), silver (Ag), aluminum (Al), bismuth (Bi), tin (Sn), and zinc (Zn). In some embodiments, the first anode active material layer 22 may include a mixture including amorphous carbon and at least one of gold (Au), platinum (Pt), palladium (Pd), silicon (Si), silver (Ag), aluminum (Al), bismuth (Bi), tin (Sn), and zinc (Zn). A mixing ratio of the mixture of amorphous carbon to the element may be, e.g., a weight ratio about 10:1 to about 1:2, about 5:1 to about 1:1, or about 4:1 to about 2:1. When the anode active material has the above composition, cycle characteristics of the all-solid secondary battery 1 may further be improved.

The anode active material in the first anode active material layer 22 may include, e.g., a mixture including first particles formed of amorphous carbon and second particles formed of a metal or a metalloid. Examples of the metal or metalloid include gold (Au), platinum (Pt), palladium (Pd), silicon (Si), silver (Ag), aluminum (Al), bismuth (Bi), tin (Sn), and zinc (Zn). In some embodiments, the metalloid may be a semiconductor. An amount of the second particles may be about 8 weight % to about 60 weight %, about 10 weight % to about 50 weight %, about 15 weight % to about 40 weight %, or about 20 weight % to about 30 weight % based on the total weight of the mixture. When the amount of the second particles is within these ranges, e.g., cycle characteristics of the all-solid secondary battery 1 may further be improved.

A lithium metal itself may be used as an anode active material. When the lithium metal in the form of a foil is used in an anode, a secondary battery including the anode may have high capacity, and a thickness of the lithium metal may be about 10 μm to about 100 μm. Also, when the lithium metal itself is used as an anode active material, distinction between a first anode active material layer and a second anode active material layer is meaningless.

[Anode Layer: Binder]

Examples of the binder in the first anode active material layer 22 include styrene-butadiene rubber (SBR), polytetrafluoroethylene, polyvinylidene fluoride, polyethylene, a vinylidene fluoride/hexafluoropropylene copolymer, polyacrylonitrile, and polymethylmethacrylate. The binder may be formed of one of the examples of the binder alone or of different binders.

When the first anode active material layer 22 includes the binder, the first anode active material layer 22 may be stabilized on the anode current collector 21. Also, cracks in the first anode active material layer 22 may be suppressed or reduced, in spite of volume change and/or relative location change of the first anode active material layer 22 during charging/discharging. For example, when the first anode active material layer 22 does not include a binder, the first anode active material layer 22 may be easily separated from the anode current collector 21. When the anode current collector 21 is separated from the first anode active material layer 22 in one or more regions, the anode current collector 21 is exposed in those regions and may contact the solid electrolyte layer 30 such that the risk of short-circuit may increase. The first anode active material layer 22 may be prepared by, e.g., coating and drying a slurry for forming the first anode active material layer 22 on the anode current collector 21. When the binder is included in the first anode active material layer 22, the anode active material may be stably dispersed in the slurry. For example, when the slurry is coated on the anode current collector 21 utilizing a screen printing method, clogging of the screen (e.g., clogging by an aggregate of the anode active material) may be suppressed or reduced.

[Anode Layer: Other Additives]

The first anode active material layer 22 may further include additives. For example, the additives may include a filler, a coating agent, a dispersant, and/or an ionic conducting agent.

[Structure of Anode Layer]

A thickness of the anode active material layer 22 may be, e.g., about 50% or less, about 40% or less, about 30% or less, about 20% or less, about 10% or less, or about 5% or less of a thickness of the cathode active material layer 12. For example, a thickness of the anode active material layer 22 may be about 1 µm to about 20 µm, about 2 µm to about 10 µm, or about 3 µm to about 7 µm. When the thickness of the anode active material layer 22 is too thin, e.g., less than about 1 µm, lithium dendrites formed between the anode active material layer 22 and the anode current collector 21 may destroy the anode active material layer 22, and thus, cycle characteristics of the all-solid secondary battery 1 may not be improved. When the thickness of the anode active material layer 22 is too thick, e.g., above about 20 µm, an energy density of the all-solid secondary battery 1 may be deteriorated and internal resistance of the all-solid secondary battery 1 by the anode active material layer 22 may increase, and thus, cycle characteristics of the all-solid secondary battery 1 may not be improved.

For example, when the thickness of the anode active material layer 22 is decreased, a charge capacity of the anode active material layer 22 may also decrease. The charge capacity of the anode active material layer 22 may be, e.g., about 50% or lower, about 40% or lower, about 30% or lower, about 20% or lower, about 10% or lower, about 5% or lower, or about 2% or lower of a charge capacity of the cathode active material layer 12. The charge capacity of the anode active material layer 22 may be, e.g., about 0.1% to about 50%, about 0.1% to about 40%, about 0.1% to about 30%, about 0.1% to about 20%, about 0.1% to about 10%, about 0.1% to about 5%, or about 0.1% to about 2% of a charge capacity of the cathode active material layer 12. When the charge capacity of the anode active material layer 22 is too low, a thickness of the anode active material layer 22 is too thin, lithium dendrites formed between the anode active material layer 22 and the anode current collector 21 during repeated charging/discharging processes may destroy the anode active material layer 22, and thus, cycle characteristics of the all-solid secondary battery 1 may not be improved. When the charge capacity of the anode active material layer 22 is too high, an energy density of the all-solid secondary battery 1 may be deteriorated and internal resistance of the all-solid secondary battery 1 by the anode active material layer 22 may increase, and thus, cycle characteristics of the all-solid secondary battery 1 may not be improved.

The charge capacity of the cathode active material layer 12 may be obtained by multiplying a weight of the cathode active material in the cathode active material layer 12 by a charge capacity density (mAh/g) of the cathode active material. When various types of materials are used as the cathode active material, a value of a charge capacity density multiplied by a weight of each of the cathode active materials is calculated, and the total of these values is a charge capacity of the cathode active material layer 12. A charge capacity of the anode active material layer 22 may be calculated in substantially the same manner. That is, a charge capacity of the anode active material layer 22 is obtained by multiplying a weight of the anode active material in the anode active material layer 22 by a charge capacity density (mAh/g) of the anode active material. When various types of materials are used as the anode active material, a value of a charge capacity density multiplied by a weight of each of the anode active materials is calculated, and the total of these values is a charge capacity of the anode active material layer 22. Here, the charge capacity densities of the cathode active material and the anode active material are capacities estimated using an all-solid half-cell in which lithium metal is used as a counter electrode. The charge capacities of the cathode active material layer 12 and the anode active material layer 22 may be directly measured by charge capacity measurement using an all-solid half-cell. When the measured charge capacity is divided by a weight of each of the active materials, a charge capacity density may be obtained. In some embodiments, the charge capacities of the cathode active material layer 12 and the anode active material layer 22 may be initial charge capacities measured in the first charging cycle.

A carbon layer may further be included between the anode active material layer 22 and the solid electrolyte layer 30.

[Anode Layer: Anode Current Collector]

For example, the anode current collector 21 may include, e.g., consist of, a material which does not react with lithium to form an alloy or compound. The material of the anode current collector 21 may be, e.g., copper (Cu), stainless steel, titanium (Ti), iron (Fe), cobalt (Co), or nickel (Ni). For example, a thickness of the anode current collector 21 may be about 1 µm to about 20 µm, about 5 µm to about 15 µm, or about 7 µm to about 10 µm.

The anode current collector 21 may include one of the above-listed metals, an alloy thereof, or a coated material of two or more of the above-listed metals. The anode current collector 12 may be, e.g., in the form of a plate or a foil.

Referring to FIG. 8, the all-solid secondary battery 1' may further include a thin film 24 including an element alloyable with lithium on the anode current collector 21. The thin film 24 may be disposed between the anode current collector 21 and the anode active material layer 22. The thin film 24 may include, e.g., an element alloyable with lithium. The element alloyable with lithium may be, e.g., gold (Au), silver (Ag), zinc (Zn), tin (Sn), indium (In), silicon (Si), aluminum (Al), and/or bismuth (Bi), but embodiments are not limited thereto, and any element which may form an alloy with lithium available in the art may be used. The thin film 24 may include, e.g., consist of, one of the above-listed metals or an alloy of two or more of the metals. Due to the disposition of the thin film 24 on the anode current collector 21, e.g., a second anode active layer (not shown) disposed between the thin film 24 and the anode active material layer 22 may further be flattened, and may further improve cycle characteristics of the all-solid secondary battery 1'. The anode active material layer 21 may be a first anode active material layer.

A thickness of the thin film 24 may be, e.g., about 1 nm to about 800 nm, about 10 nm to about 700 nm, about 50 nm to about 600 nm, or about 100 nm to about 500 nm. When the thickness of the thin film is less than 1 nm, function of the thin film 24 may be difficult to obtain. When the thickness of the thin film 24 is more than about 800 nm, the thin film 24 may absorb lithium and an amount of lithium deposited on the anode layer 20 may decrease, and thus, energy density of the all-solid secondary battery 1' may decrease, and cycle characteristics of the all-solid secondary battery 1' may be deteriorated. The thin film 24 may be formed on the anode current collector 21, e.g., by vacuum deposition, sputtering, or plating.

[Anode Layer: Deposition Layer]

Figure 9:
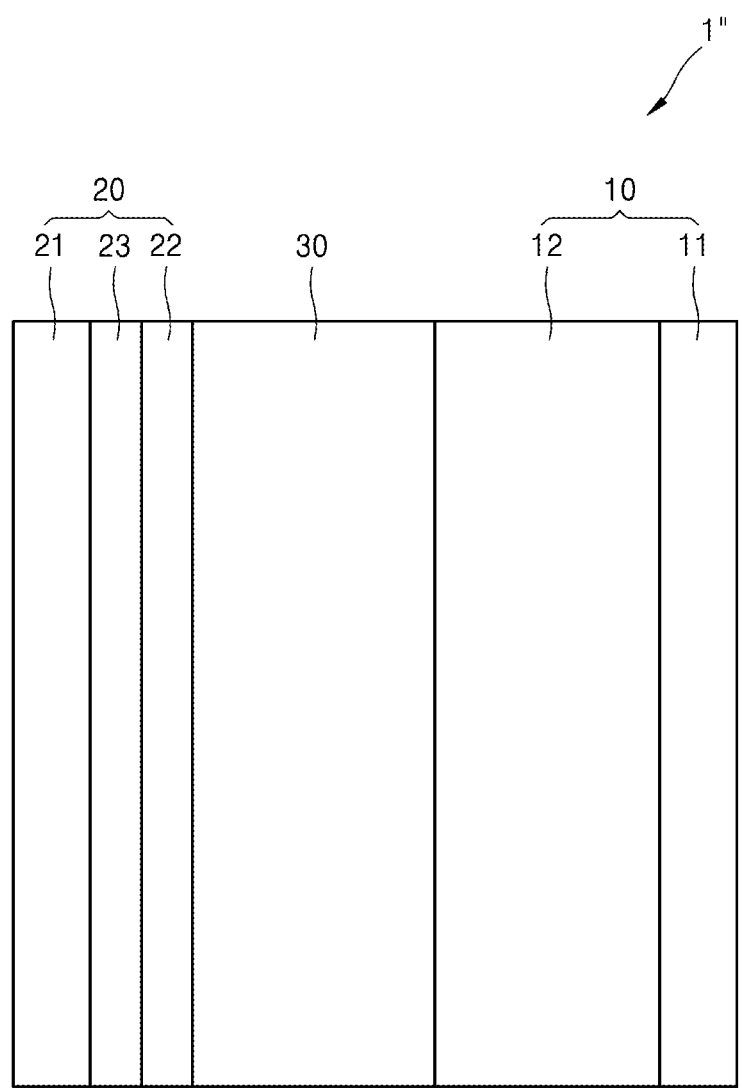
FIG. 9 is a schematic view of a structure of an all-solid secondary battery according to another embodiment.

Referring to FIG. 9, an all-solid secondary battery 1" may further include, e.g., a second anode active material layer 23 disposed between the anode current collector 21 and the first anode active material layer 22. The second anode active material layer 23 may be a metal layer including lithium or a lithium alloy. Thus, the second anode active material layer 23, as a metal layer including lithium, may serve as a reservoir of lithium. Examples of the lithium alloy may include an Li—Al alloy, an Li—Sn alloy, an Li—In alloy, an Li—Ag alloy, an Li—Au alloy, an Li—Zn alloy, an Li—Ge alloy, and an Li—Si alloy. The second anode active material layer 23 may be formed of one of the alloys alone, lithium, or a combination of various types of alloys.

A thickness of the second anode active material layer 23 may be, e.g., about 1 μm to about 1,000 μm, about 1 μm to about 500 μm, about 1 μm to about 200 μm, about 1 μm to about 150 μm, about 1 μm to about 100 μm, or about 1 μm to about 50 μm. When the thickness of the second anode active material layer 23 is too thin, e.g., about 1 μm, the second anode active material layer 23 may not serve as a reservoir of lithium. When the thickness of the second anode active material layer is too thick, e.g., more than about 1,000 μm, mass and volume of the all-solid secondary battery 1" may increase, and thus, cycle characteristics may be deteriorated. The second anode active material layer 23 may be, e.g., a metal foil having a thickness within the range described above.

In the all-solid secondary battery 1", the second anode active material layer 23 may be arranged between the anode current collector 21 and the first anode active material layer 22 before assembling the all-solid secondary battery 1" or may be deposited between the anode current collector 21 and the first anode active material layer 22 by charging after assembling the all-solid secondary battery 1".

When the second anode active material layer 23 is arranged between the anode current collector 21 and the first anode active material layer 22 before assembling the all-solid secondary battery 1", the second anode active material layer 23 that is a metal layer including lithium may serve as a reservoir of lithium. Cycle characteristics of the all-solid secondary battery 1" including the second anode active material layer 23 may further be improved. For example, a lithium foil may be arranged between the anode current collector 21 and the first anode active material layer 22 before assembling the all-solid secondary battery 1".

If the second anode active material layer 23 were to be arranged by charging after assembling the all-solid secondary battery 1", energy density of the all-solid secondary battery 1" would have increased during the assembling process (due to lack of the second anode active material layer 23 during the assembling process). For example, when the all-solid secondary battery 1" is charged, charging may be performed in a state exceeding the charging capacity of the first anode active material layer 22. That is, the first anode active material layer 22 may be overcharged. At the beginning of charging, the first anode active material layer 22 may absorb lithium. That is, the anode active material included in the first anode active material layer 22 may form an alloy or compound with lithium ions that have migrated from the cathode layer 10. When the first anode active material layer 22 is overcharged to exceed the capacity thereof, e.g., lithium may be deposited on a rear surface of the first anode active material layer 22 (i.e., between the anode current collector 21 and the first anode active material layer 22) and a metal layer corresponding to the second anode active material layer 23 may be formed by the deposited lithium. The second anode active material layer 23 may be a metal layer mainly composed of lithium (i.e., lithium metal). These results are obtained because the anode active material included in the first anode active material layer 22 may be formed of a material forming an alloy or compound with lithium. During discharging, lithium of the first anode active material layer 22 and the second anode active material layer 23, i.e., the metal layer, may be ionized to migrate in a direction toward the cathode layer 10. Thus, it is possible to use lithium as an anode active material in the all-solid secondary battery 1".

In addition, the second anode active material layer 23 may be coated with the first anode active material layer 22, the anode active material layer 22 may serve as a protective layer for the second anode active material layer 23, i.e., the metal layer, and may inhibit the growth of lithium dendrite. Therefore, short circuits and decrease in capacity of the all-solid secondary battery 1" may be prevented, and thus cycle characteristics of the all-solid secondary battery 1" may be improved. Also, when the second anode active material layer 23 is arranged by charging after assembling the all-solid secondary battery 1", the anode current collector 21, the first anode active material layer 22, and an area therebetween may be, e.g., Li-free areas not including lithium (Li) at the beginning of charging or after discharging of the all-solid secondary battery 1.

Hereinafter, a method of preparing the sulfide solid electrolyte according to an embodiment will be described.

The sulfide solid electrolyte may be prepared using a method including contacting a precursor mixture prepared by mixing at least two precursors including lithium (Li), sulfur (S), phosphorus (P), oxygen (O), and halogen atoms, which are precursors for forming a sulfide solid electrolyte. Then, the precursor mixture may be heat-treating at a temperature of about 350° C. or higher.

Examples of precursors including lithium may include a lithium compound, e.g., lithium sulfide ($Li_2S$), lithium oxide ($Li_2O$), lithium carbonate ($Li_2CO_3$), lithium nitrate ($LiNO_3$), lithium phosphate ($Li_3PO_4$), or lithium hydroxide (LiOH), a lithium metal simple substance, or a combination thereof. Examples of precursors including halogen atoms may include lithium fluoride (LiF), lithium chloride (LiCl), lithium bromide (LiBr), lithium iodide (LiI), phosphorus pentachloride ($PCl_5$), phosphorus trichloride ($PCl_3$), phosphorus pentabromide ($PBr_5$), phosphorus tribromide ($PBr_3$), or a combination thereof. Examples of precursors including oxygen may include lithium oxide ($Li_2O$), lithium peroxide ($Li_2O_2$), phosphorus pentoxide ($P_2O_5$), a mixture thereof, or oxygen gas ($O_2$). Examples of precursors including sulfur may include S, $SCl_2$, $S_2Cl_2$, $S_2Br_2$, or a combination thereof. Examples of precursors including phosphorus may include a phosphorus sulfide, e.g., diphosphorus trisulfide ($P_2S_3$) or diphosphorus pentasulfide ($P_2S_5$), a phosphorus compound, e.g., sodium phosphate ($Na_3PO_4$); a phosphorus simple substance; $(NH_4)_2HPO_4$, $(NH_4)H_2PO_4$, $LiPO_3$, $LiH_2PO_4$, or a combination thereof.

The heat-treating may be performed under vacuum conditions at a temperature of 500° C. or higher, e.g., about 500° C. to about 650° C. for 5 hours or more, e.g., 8 hours or more, about 10 hours or more, or about 10 hours to about 15 hours. The atmosphere of the heat-treating may be performed in vacuum using a torch sealing method, which will later be described. In a vacuum, impurities, e.g., oxygen and nitrogen, other than the raw materials of the designed composition are not introduced, and as a result, the moisture stability, structural stability, and ionic conductivity of the resulting sulfide solid electrolyte are improved.

The precursor mixture may be added to a borosilicate ampoule, and a vacuum condition may be made by torch-sealing under a vacuum condition. According to the preparation method as described above, a sulfide solid electrolyte having high purity and high ionic conductivity may be obtained without using a conventional heat-treatment process performed under vacuum conditions with expensive and toxic $H_2S$. When the heat-treating is performed at a temperature within the range above, impurity phases may not be formed, and a sulfide solid electrolyte having high purity and improved physical properties and electrochemical stability may be obtained.

In the method of preparing the sulfide solid electrolyte according to an embodiment, contacting of the precursors in the mixture includes mechanically milling each of the precursor mixture.

Next, a method of preparing an all-solid secondary battery using the sulfide solid electrolyte will be described.

First, the cathode active material, the binder, the solid electrolyte, the conducting agent, and the solvent may be mixed to prepare a composition for a cathode active material layer. Materials other than the cathode active material may be omitted.

The composition for a cathode active material layer may be coated on the cathode current collector and dried to form the cathode active material layer, thereby providing the cathode layer. The drying may be performed at a temperature of about 40° C. to about 60° C. When the solvent is not used, the drying process may be omitted. Separately, the method may include providing an anode layer including an anode current collector and a first anode active material layer; preparing a stack by arranging a solid electrolyte layer between the anode layer and the cathode layer; and pressing the stack.

The solid electrolyte layer may be a solid electrolyte layer including the sulfide solid electrolyte according to an embodiment.

The pressing may be performed at a temperature of about 25° C. to about 90° C. with a pressure of 550 MPa or less, e.g., 500 MPa or less, or about 400 MPa to about 500 MPa, to complete the manufacture of the all-solid secondary battery. A pressing time may vary according to temperature and pressure and may be, e.g., less than about 30 minutes. The pressure may be applied by, e.g., isostatic pressing, roll pressing, or plate pressing.

The all-solid secondary battery according to an embodiment may be applied to large-sized batteries or energy storage systems (ESS).

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

(Preparation of Solid Electrolyte)

Examples 1 to 3

Precursors, $Li_2S$, $P_2S_5$, $Li_2O$, LiCl, LiBr, and LiI, were quantified and mixed with a mortar in a glove box for at least 1 hour to prepare a precursor mixture. After adding 2000 mg of the powder materials obtained by mechanically milling of the precursor mixture to a Borosilicate ampoule, the ampoule was connected to a vacuum pump to make a vacuum atmosphere and sealed using a torch. A temperature of the ampoule sealed in a vacuum atmosphere was increased to 600° C. at a temperature increase rate of 3° C./min, and heat-treated at 600° C. for 12 hours to obtain a sulfide solid electrolyte having a composition of Table 1.

Comparative Examples 1 and 2

Sulfide solid electrolytes were obtained in the same manner as in Example 1, except that the amounts of $Li_2S$, $P_2S_5$, $Li_2O$, LiCl, and LiBr were weighed respectively to obtain the sulfide solid electrolytes according to Comparative Examples 1 and 2 shown in Table 1 below.

Comparative Example 3

A sulfide solid electrolyte was obtained in the same manner as in Example 1, except that the amounts of $Li_2S$, $P_2S_5$, LiCl, and LiBr were weighed respectively to obtain the sulfide solid electrolytes according to Comparative Example 3 shown in Table 1 below.

Comparative Example 4

A sulfide solid electrolyte was obtained in the same manner as in Example 1, except that the amounts of $Li_2S$, $P_2S_5$, LiCl, LiBr, and LiI were weighed respectively to obtain the sulfide solid electrolytes according to Comparative Example 4 shown in Table 1 below.

Comparative Example 5

A sulfide argyrodite commercial solid electrolyte (NEI. Corp.) in a composition of $Li_6PS_5Cl$ having an integer stoichiometric ratio was used.

TABLE 1

| Sample | Composition | Atomic ratio S/O | Cl/X | Li/S |
|---|---|---|---|---|
| Example 1 | $Li_{5.57}P_1S_{4.06}O_{0.45}Cl_{1.40}Br_{0.13}I_{0.01}$ | 9.02 | 10 | 1.37 |
| Example 2 | $Li_{5.57}PS_{3.62}O_{0.90}Cl_{1.40}Br_{0.13}I_{0.01}$ | 4.02 | 10 | 1.54 |
| Example 3 | $Li_{5.57}PS_{4.06}O_{0.45}Cl_{1.40}Br_{0.13}I_{0.02}$ | 9.02 | 9.33 | 1.37 |
| Comparative Example 1 | $Li_{5.567}PS_{4.06}O_{0.45}Cl_{1.41}Br_{0.13}$ | 9.02 | — | — |
| Comparative Example 2 | $Li_{5.57}PS_{3.62}O_{0.90}Cl_{1.41}Br_{0.13}$ | 4.02 | — | — |
| Comparative Example 3 | $Li_{5.57}PS_{4.52}Cl_{1.41}Br_{0.13}$ | — | — | — |
| Comparative Example 4 | $Li_{5.57}PS_{4.52}Cl_{1.40}Br_{0.13}I_{0.01}$ | — | 10 | — |
| Comparative Example 5 | $Li_6PS_5Cl$ | — | — | — |

17

(Preparation of all-Solid Secondary Battery)

Manufacture Example 1

(Preparation of Cathode Layer)
$LiNi_{0.90}Co_{0.05}Mn_{0.05}O_2$ (NCM) as a cathode active material, the argyrodite solid electrolyte of Example 1 as a solid electrolyte, and carbon nanofiber (CNF) as a conducting agent were mixed at a weight ratio of 60:35:5 to prepare a composition for a cathode active material layer. The composition for a cathode active material layer was molded in the form of a sheet.

(Preparation of Anode Layer)
A stainless steel foil having a thickness of 10 μm was prepared as an anode current collector, and a Li metal foil was stacked on the anode current collector to prepare an anode layer.

(Preparation of Solid Electrolyte Layer)
A pressure of 300 MPa was applied on the solid electrolyte without using a binder to prepare a solid electrolyte layer through a process of preparing a pellet.

(Preparation of all-solid secondary battery)
In the process described above, the solid electrolyte layer was disposed between the cathode layer and the anode layer to prepare a stack. The stack was pressed at 25° C. with a pressure of 300 MPa for 2 minutes to prepare an all-solid secondary battery. Through this pressing treatment, the adhesive force between the cathode and the solid electrolyte layer and between the anode and the solid electrolyte layer was strengthened, and the battery characteristics were improved.

Comparative Manufacture Example 1

An all-solid secondary battery was prepared in the same manner as in Manufacture Example 1, except that the sulfide solid electrolyte of Comparative Example 5 was used instead of the sulfide solid electrolyte of Example 1 in the preparation of the solid electrolyte layer.

Evaluation Example 1: Measurement of Ionic Conductivity

Powders of the sulfide solid electrolytes prepared in Examples 1 to 3 and Comparative Examples 1 to 4 and 5 were each placed in a mold having a diameter of 13 mm, and the powder was pressed with a pressure of 300 MPa to mold in the form of a pellet. Both surfaces of the pellet were coated with an indium (In) thin film to prepare a sample to measure its ion conductivity. An impedance of the sample was measured using a potentiostat, Solartron 1470E (available from Solartron Analytical Co. Ltd.), and the results are shown on the Nyquist plot, from which ionic conductivity at 25° C. was measured.

The measured ionic conductivities are shown in Table 2. Also, pellet densities of the sulfide solid electrolytes are shown in Table 2.

TABLE 2

| Sample | Composition | Resistance (Ω) | Ion conductivity (mS/cm) at (25° C.) | Pellet density (g/cc) |
|---|---|---|---|---|
| Example 1 | $Li_{5.57}P_1S_{4.06}O_{0.45}Cl_{1.40}Br_{0.13}I_{0.01}$ | 21.8 | 3.39 | 1.53 |
| Example 2 | $Li_{5.57}PS_{3.62}O_{0.90}Cl_{1.40}Br_{0.13}I_{0.01}$ | 25.7 | 2.94 | 1.51 |
| Example 3 | $Li_{5.57}PS_{4.06}O_{0.45}Cl_{1.40}Br_{0.13}I_{0.02}$ | 24.4 | 2.96 | 1.57 |
| Comparative Ex. 1 | $Li_{5.567}PS_{4.06}O_{0.45}Cl_{1.41}Br_{0.13}$ | 29.5 | 2.45 | 1.57 |
| Comparative Ex. 2 | $Li_{5.57}PS_{3.62}O_{0.90}Cl_{1.41}Br_{0.13}$ | 30.0 | 2.46 | 1.54 |
| Comparative Ex. 3 | $Li_{5.57}PS_{4.52}Cl_{1.41}Br_{0.13}$ | 27.5 | 2.71 | 1.52 |
| Comparative Ex. 4 | $Li_{5.57}PS_{4.52}Cl_{1.40}Br_{0.13}I_{0.01}$ | 24.0 | 3.01 | 1.57 |
| Comparative Ex. 5 | $Li_6PS_5Cl$ | 36.3 | 2.08 | 1.51 |

As shown in Table 2, the solid electrolytes of Examples 1 to 3 had ionic conductivity of about 2.9 mS/cm or higher, which confirmed that the solid electrolytes had ionic conductivity appropriate to the solid electrolyte for an all-solid secondary battery. In contrast, the sulfide solid electrolytes of Comparative Examples 1 to 3 and 5 showed deteriorated characteristics as compared to those of the sulfide solid electrolytes of Examples 1 to 3, as shown in Table 2. Also, although the sulfide solid electrolyte of Comparative Example 4 had excellent ionic conductivity, the moisture stability was deteriorated as shown in Table 3 (below), and thus the sulfide solid electrolyte of Comparative Example 4 was not practically used.

The compositions of Comparative Example 1 and Examples 1 and 3 have the same compositions of lithium, phosphorus, sulfur, and oxygen. The sulfide solid electrolytes showed a tendency of amounts of iodine in the materials increasing in the order of Comparative Example 1, Example 1, and Example 3, and the ionic conductivities thereof are 2.46 mS/cm, 3.39 mS/cm, and 2.96 mS/cm, respectively. This shows that the ionic conductivity was the highest when the stoichiometric ratio of iodine in the composition formula was 0.01, and the composition of Example 1 may be determined as an optimized composition. When the stoichiometric ratio of iodine is 0.01, the phenomenon of improving ionic conductivity may be observed in Example 2 having an increased amount of iodine compared to that of Comparative Example 2 and in Comparative Example 4 having an increased amount of iodine compared to that of Comparative Example 3.

Evaluation Example 2: Moisture Stability

An exposure test in a dry room was performed on the sulfide solid electrolytes of Examples 1 and 2 and Comparative Examples 1 and 2 (dew point −45° C.) to measure ionic conductivity of the sulfide solid electrolyte before exposure and after 1, 3, or 7 days of exposure to the dry room was measured. Then, the ionic conductivity retention rates were measured according to Equation 7 (below), and the results are shown in Table 3 below. Also, change in the ionic conductivity retention rates of the sulfide solid electrolytes of Examples 1 and 2 and Comparative Examples 4 and 5 are shown in FIG. 1.

Ion conductivity retention rate={(ionic conductivity of sulfide solid electrolyte 1, 3, or 7 days after exposure to dry room)/(ionic conductivity before exposure to dry room)}×100     Equation 7

TABLE 3

| Sample | Ionic conductivity retention rate (%) (Ionic conductivity absolute value, mS/cm) | | | |
|---|---|---|---|---|
| | Before exposure | 1 Day after exposure | 3 Days after exposure | 7 Days after exposure |
| Example 1 | 100 (3.39) | 92.0 (3.12) | 84.1 (2.85) | 77.0 (2.61) |
| Example 2 | 100 (2.94) | 88.4 (2.60) | 86.7 (2.55) | 81.0 (2.38) |
| Comparative Example 4 | 100 (3.01) | 88.7 (2.67) | 80.7 (2.43) | 55.1 (1.66) |
| Comparative Example 5 | 100 (2.08) | 93.8 (1.95) | 82.2 (1.71) | 54.3 (1.13) |

Referring to Table 3, the sulfide solid electrolytes of Examples 1 and 2 and Comparative Examples 4 and 5 all had reduced ionic conductivity due to the reaction with moisture according to their exposure to the atmosphere. The ionic conductivity retention rates of all 4 types of materials, on which the moisture stability evaluation was performed, were decreased to 90% after 1 day of exposure. However, there is a significant difference between Examples 1 and 2 and Comparative Examples 4 and 5 in the behavior of ionic conductivity retention rate after 3 days and 7 days of exposure (see FIG. 1). The reaction rates of the reaction between moisture in the dry room and the sulfide solid electrolytes of Examples 1 and 2 in the beginning of the exposure were at the same level, but the reaction rates were slowed as compared to those of Comparative Examples 4 and 5, and thus it may be deemed that the ionic conductivity was maintained. This may be deemed that oxygen substituted the sulfur site in the composition corresponding to Examples 1 and 2, which replaces some of P—S bonds having weak adhesive strength with P—O bonds having relatively strong adhesive strength, and thus the reactivity of the electrolyte with moisture in the dry room may be improved. On the contrary, when materials having compositions of Comparative Examples 4 and 5 in which oxygen is not substituted were exposed to the dry room environment for 7 days, it may be observed that the ionic conductivity was decreased to 50% of that before the exposure.

Evaluation Example 3: X-Ray Diffraction (XRD) Analysis

X-ray diffraction (XRD) patterns of the sulfide solid electrolytes prepared in Examples 1 and 2 and Comparative Examples 4 and 5 were measured. The XRD analysis was performed using Miniflex 600 (available from Rigaku), and a Cu-Kα radiation was used in the XRD pattern measurement. The XRD spectrum of the sulfide solid electrolytes of Examples 1 and 2 and Comparative Examples 4 and 5 is shown in FIG. 2.

Figure 2:
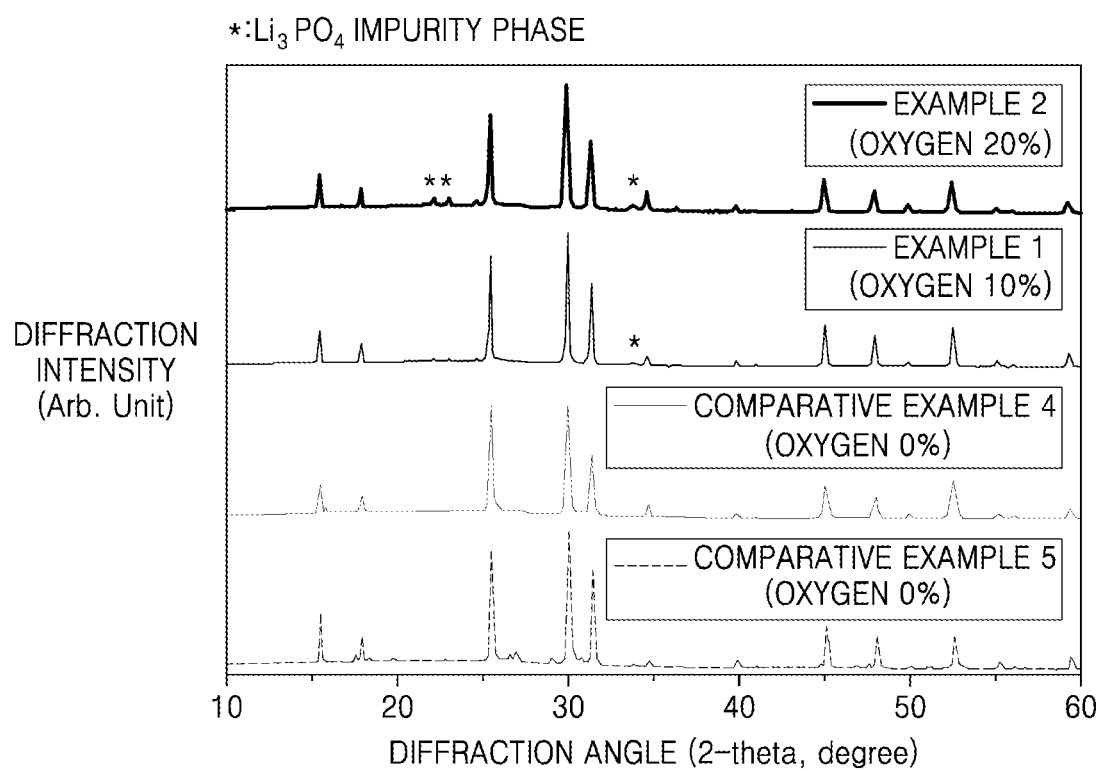
FIG. 2 shows X-ray diffraction (XRD) patterns of the sulfide solid electrolytes prepared in Examples 1 and 2 and Comparative Examples 4 and 5.

Referring to FIG. 2, it is known that the sulfide solid electrolytes of Examples 1 and 2 had an argyrodite crystal structure as in the case of $Li_6PS_5Cl$ of Comparative Examples 4 and 5. Also, an insignificant impurity peak was observed from Example 1, in which 10% of sulfur was substituted with oxygen. Also, a significant impurity peak (estimated as $Li_3PO_4$, Cubic F-43m phase) was observed from Example 2, in which 20% of sulfur was substituted with oxygen. Also, lattice parameters of the sulfide solid electrolytes prepared in Examples 1 and 3 and Comparative Examples 1 and 5 were investigated and shown in Table 4.

Whole pattern fitting (WPF) of the XRD pattern was interpreted using a crystal structure analysis software PDXL available from Rigaku, and each crystal component included in the XRD pattern was specified to calculate the lattice parameter of each of the components. The results of the evaluation are shown in Table 4.

TABLE 4

| Sample | Lattice parameter (Å) |
|---|---|
| Example 1 | 9.832 |
| Example 3 | 9.834 |
| Comparative Example 1 | 9.829 |
| Comparative Example 5 | 9.806 |

Referring to Table 4, the sulfide solid electrolytes of Examples 1 and 3 had a lattice parameter that is 0.23% to 0.29% increased as compared to that of Comparative Example 5 not including oxygen, bromine, and iodine. It may be seen that the lattice parameter increased as the electrolytes of Examples 1 and 3 included oxygen, bromine, and iodine, which have ion radii larger than those of lithium, phosphorus, sulfur, and chlorine forming the electrolyte of Comparative Example 5, the lattice parameter of the material having both ionic conductivity and moisture stability increased was in a range of about 9.800 Å to about 9.880 Å, and particularly, when the lattice parameter was 9.830 Å, the electrolyte had improved ionic conductivity and moisture stability.

Evaluation Example 4: Charge/Discharge Test

Charge/discharge characteristics of the all-solid secondary batteries prepared in Manufacture Example 1 and Comparative Manufacture Example 1 were evaluated by the following charge/discharge test. The evaluation was performed in a 45° C. constant-temperature chamber. The batteries were each charged at a constant current of 0.05 C for 10 hours until the battery voltage was 4.25 V, and then charged at a constant voltage at 4.25 V and cut-off at a current value of 0.025 C. Each of the batteries was discharged at a constant current of 0.05 C for 20 hours until the voltage reached 2.5 V (first cycle). In all cycles except the first cycle, the batteries were each charged at a constant current in various conditions until 4.25 V, and then charged at a constant voltage at 4.25 V and cut-off at a current value of 0.05 C. Then, the battery was charged at a constant current of 0.1 C for 10 hours until the voltage reached 4.25 V and discharged at a constant current of 0.05 C for 3 hours until the voltage reached 2.5 V (second cycle). Subsequently, the battery was charged at a constant current of 0.1 C for 10 hours until the voltage reached 4.25 V. Then, the battery was discharged at a constant current of 0.1 C for 2 hours until the voltage reached 2.5 V (third cycle). Subsequently, the battery was charged at a constant current of 0.1 C for 10 hours until the voltage reached 4.25 V. Then, the battery was discharged at a constant current of 0.2 C for 1 hour until the voltage reached 2.5 V (fourth cycle).

Thereafter, the battery was charged at a constant current of 0.1 C for 3 hours until the voltage reached 4.25 V. Then, the battery was discharged at a constant current of 0.5 C for 3 hours until the voltage reached 2.5 V (fifth cycle).

Thereafter, the battery was charged at a constant current of 0.1 C for 3 hours until the voltage reached 4.25 V. Then, the battery was discharged at a constant current of 1.0 C for 3 hours until the voltage reached 2.5 V (sixth cycle).

Thereafter, the battery was charged at a constant current of 0.1 C for 3 hours until the voltage reached 4.25 V. Then, the battery was discharged at a constant current of 0.05 C for 3 hours until the voltage reached 2.5 V (seventh cycle).

Thereafter, the battery was charged at a constant current of 0.33 C for 3 hours until the voltage reached 4.25 V. Then, the battery was discharged at a constant current of 0.33 C for 3 hours until the voltage reached 2.5 V (eighth cycle). Next, the same conditions of the eighth cycle were repeated 24 times to evaluate lifespan of the battery at the charge/discharge rate of 0.33 C.

The cycle same with the eighth cycle was repeated 25 times in total to investigate average voltage, lifespan, and capacity characteristics, and the results are shown in FIGS. 3 to 6 and Table 5.

Figure 3:
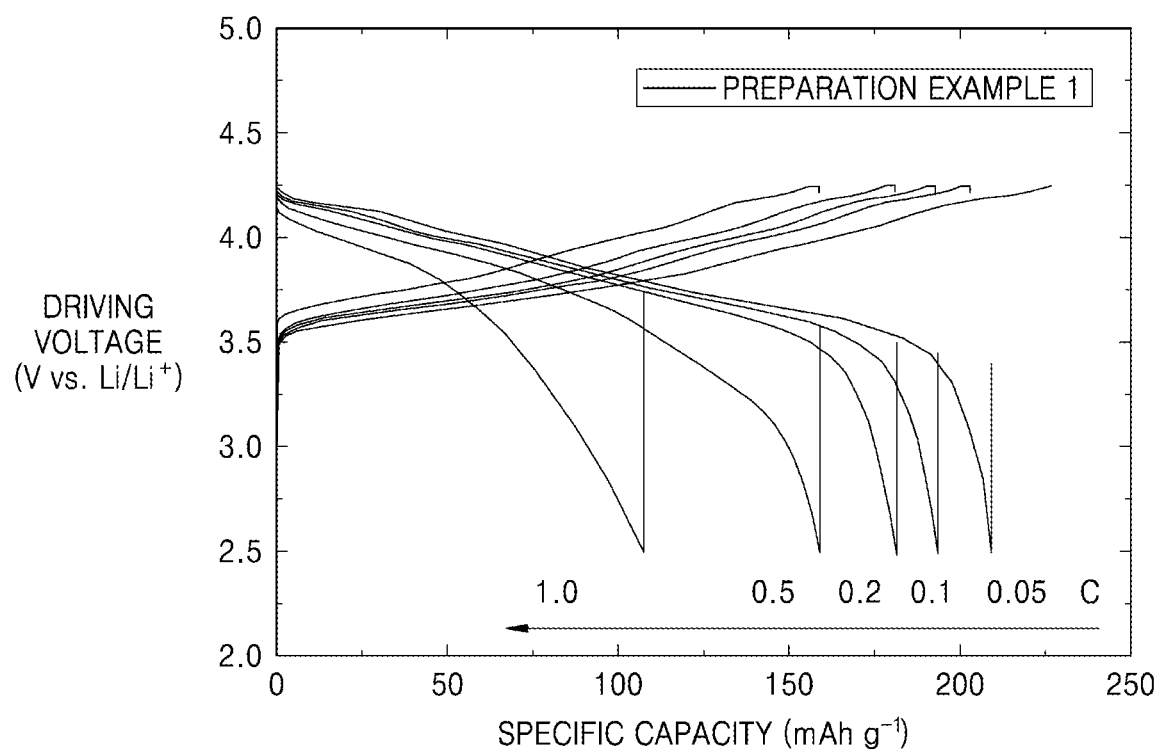
FIG. 3 shows battery voltage change of an all-solid secondary battery of Manufacture Example 1 according to specific capacity.
Figure 4:
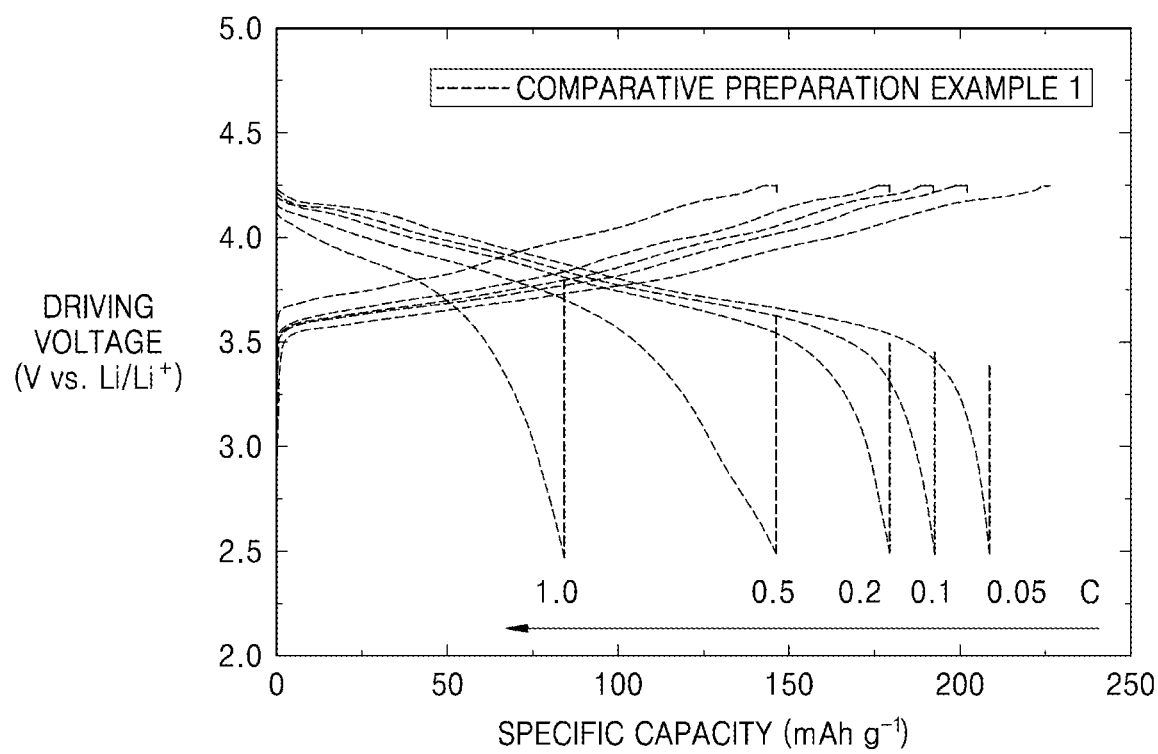
FIG. 4 shows battery voltage change of an all-solid secondary battery of Comparative Manufacture Example 1 according to specific capacity.
Figure 5:
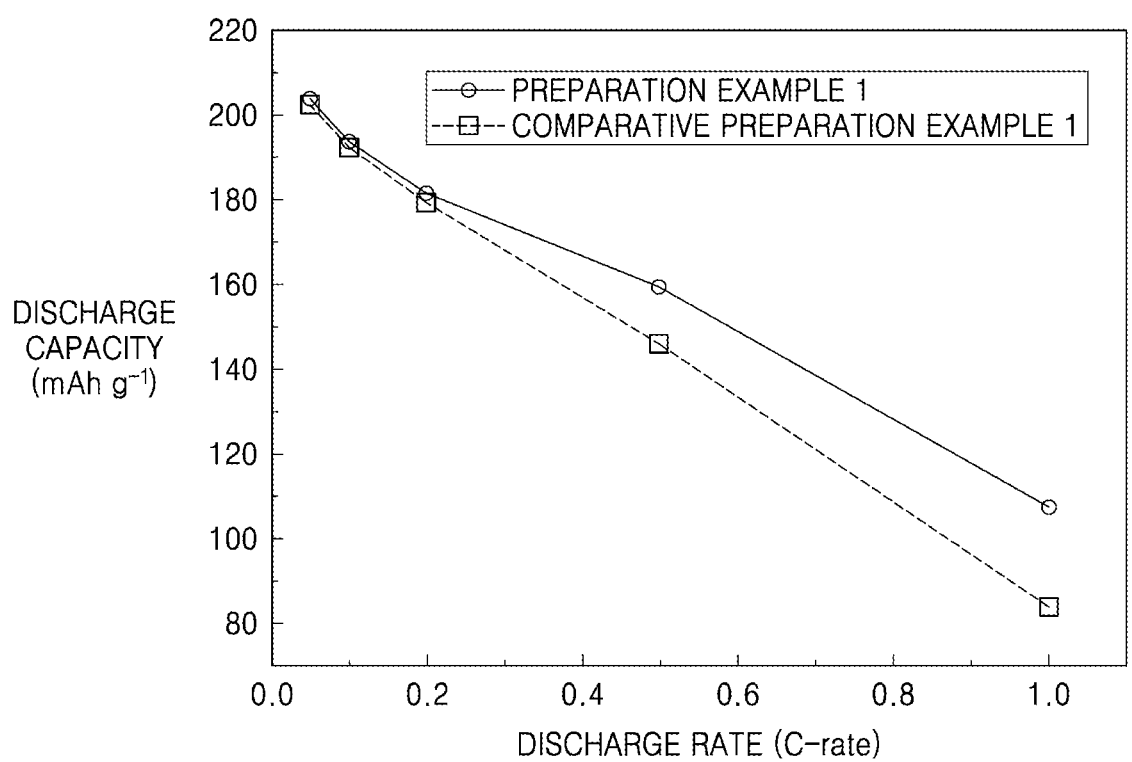
FIG. 5 shows discharge capacity change of the all-solid secondary batteries of Manufacture Example 1 and Comparative Manufacture Example 1 according to discharge rates.
Figure 6:
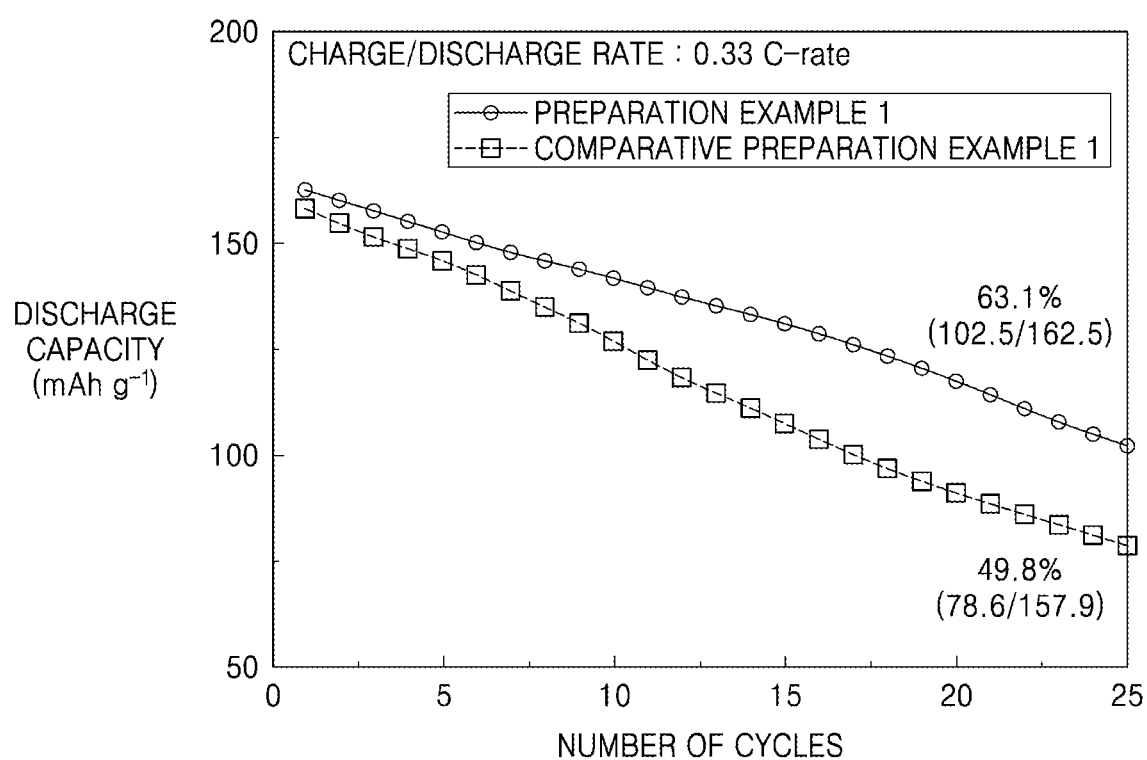
FIG. 6 shows lifespan characteristics of the all-solid secondary batteries of Manufacture Example 1 and Comparative Manufacture Example 1.

FIGS. 3 and 4 show voltage change of the all-solid secondary batteries prepared in Manufacture Example 1 and Comparative Manufacture Example 1 according to specific capacity. Also, FIG. 5 shows discharge capacity change of the all-solid secondary batteries of Manufacture Example 1 and Comparative Manufacture Example 1 according to discharge rates, and FIG. 6 shows discharge capacity change of the all-solid secondary batteries of Manufacture Example 1 and Comparative Manufacture Example 1.

istics and improved lifespan characteristics as compared to those of the all-solid secondary battery of Comparative Manufacture Example 1.

By way of summation and review, a sulfide solid electrolyte may be used as a solid electrolyte of an all-solid secondary battery. Since chemical stability of a sulfide solid electrolyte may be relatively lower than that of an oxide-based solid electrolyte, operation of an all-solid secondary battery including a sulfide solid electrolyte may not be stable. That is, a sulfide solid electrolyte may easily react with moisture in the atmosphere or with moisture during the manufacturing process, e.g., due to residual $Li_2S$ or $P_2S_7$ crosslinked sulfur contained in the structure, thereby exhibiting deterioration of ionic conductivity due to the generation of hydrogen sulfide gas, e.g., generation of hydrogen sulfide (H2S) gas through a reaction with moisture. As such, the sulfide solid electrolyte may require strict handling conditions, e.g., in an environment such as a glove box in an argon gas atmosphere or a dry room in which moisture has been removed, thereby increasing complexity of a large-area and mass-production of all-solid secondary batteries using the sulfide solid electrolyte.

In contrast, one or more example embodiments provide a sulfide solid electrolyte for an all-solid secondary battery with improved moisture stability and excellent ion conductivity. One or more embodiments include a method of preparing the sulfide solid electrolyte. One or more embodi-

TABLE 5

| Sample | Lifespan | 1$^{st}$ (0.05/0.05 C) CH | | C.E | 2$^{nd}$ (0.1/0.05 C) DCH (ret., %) | 3$^{rd}$ (0.1/0.1 C) DCH (ret., %) | 4th (0.1/0.2 C) DCH (ret., %) | 5$^{th}$ (0.1/0.5 C) DCH (ret., %) | 6$^{th}$ (0.1/1 C) DCH (ret., %) | 7$^{th}$ (0.1/0.05 C) DCH (ret., %) |
|---|---|---|---|---|---|---|---|---|---|---|
| | | CH | DCH | | | | | | | |
| Manuf. Example 1 | 63.1% (102.5/162.5) | 226.9 | 209.1 | 92 | 203.5 (97.3%) | 193.3 (92.4%) | 181.2 (86.7%) | 159.1 (76.1%) | 107.2 (51.3%) | 195.6 (93.5%) |
| Comp. Manuf. Example 1 | 49.8 (78.6/157.9) | 225.6 | 208.3 | 92 | 202.2 (97.1%) | 192.1 (92.2%) | 179.1 (86.0%) | 145.8 (70.0%) | 83.5 (40.1%) | 193.5 (92.9%) |

The lifespan in Table 5 is a capacity retention rate after evaluating capacity change during 25 cycles at a charge/discharge rate of 0.33 C, which is a value obtained by dividing a discharge capacity at the 32nd cycle with a discharge capacity at the 8th cycle. Also, CH represents a charge capacity (mAhg$^{-1}$), and DCH represents a discharge capacity (mAh g$^{-1}$).

Referring to Table 5 and FIGS. 3 and 4, the all-solid secondary battery of Manufacture Example 1 had the initial capacity and charge/discharge efficiency that were the same as those of the battery of Comparative Manufacture Example 1, but the battery of Manufacture Example 1 had a higher discharge capacity at the 5th and 6th cycles, which were under high-rate discharge conditions, than that of the battery of Comparative Example 1, and a high capacity retention rate at the 25th cycle lifespan evaluation.

Referring to FIGS. 5 and 6, the high discharge capacity at high-rate may be deemed as the result of improved ionic conductivity by iodine doping, and the improvement in lifespan characteristics may be deemed as the result of using a sulfide solid electrolyte having an improved structural stability by substituting oxygen in the sulfur site. Therefore, it may be known that the all-solid secondary battery of Manufacture Example 1 had improved high-rate characterments include an all-solid secondary battery including the sulfide solid electrolyte to have improved capacity, lifespan, and high-rate characteristics.

That is, according to an aspect of one or more embodiments, a sulfide solid electrolyte for an all-solid secondary battery may have structural stability by substituting some sulfur atoms with oxygen atoms and containing three types of halogen atoms. Such a sulfide solid electrolyte shows improved stability with respect to a moist environment and has improved ionic conductivity. When such a sulfide solid electrolyte is used, all-solid secondary batteries with improved capacity, lifespan, and high-rate characteristics may be prepared in the large-area and mass-production.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A sulfide solid electrolyte for an all-solid secondary battery, the sulfide solid electrolyte comprising lithium, phosphorus, sulfur, oxygen, and halogen atoms, wherein:
the sulfide solid electrolyte has an argyrodite-type crystal structure,
the halogen atoms include chlorine and at least two of bromine, iodine, and fluorine,
an atomic ratio of sulfur to oxygen in the sulfide solid electrolyte is about 4 or higher, and
an atomic ratio of chlorine to the at least two of bromine, iodine, and fluorine is about 9 or higher.

2. The sulfide solid electrolyte as claimed in claim 1, wherein:
the halogen atoms include chlorine, bromine, and iodine, and
an atomic ratio R1 of the chlorine to the phosphorus, an atomic ratio R2 of the bromine to the phosphorus, and an atomic ratio R3 of the iodine to the phosphorus satisfy Equation 1:

$$1.3 \leq R1+R2+R3 \leq 1.8.$$  Equation 1

3. The sulfide solid electrolyte as claimed in claim 1, wherein a lattice parameter of the argyrodite-type crystal structure is greater than about 9.800 angstroms and less than about 9.880 angstroms.

4. The sulfide solid electrolyte as claimed in claim 1, wherein an atomic ratio R1 of the chlorine to the phosphorus, an atomic ratio R2 of the bromine to the phosphorus, and an atomic ratio R3 of the iodine to the phosphorus satisfy Equations 2 to 4:

$$1.3 \leq R1 \leq 1.5$$  Equation 2

$$0 \leq R2 \leq 0.2$$  Equation 3

$$0 \leq R3 \leq 0.05.$$  Equation 4

5. The sulfide solid electrolyte as claimed in claim 1, wherein an atomic ratio R4 of the lithium to the phosphorus and an atomic ratio R5 of the lithium to the sulfur satisfy Equations 5 and 6:

$$5.4 \leq R4 < 5.7$$  Equation 5

$$1.3 \leq R5 < 1.55.$$  Equation 6

6. The sulfide solid electrolyte as claimed in claim 1, wherein an amount of the halogen atoms is about 20 atom % or less, based on a total amount of the sulfide solid electrolyte.

7. The sulfide solid electrolyte as claimed in claim 1, wherein the sulfide solid electrolyte is a compound represented by Formula 1:

$$Li_aP_1S_bO_cHa_d,$$  Formula 1 wherein, in Formula 1, $5.4<a<5.6$, $4.4<(b+c)<4.6$, $0<c/(c+b)<0.2$, and $1.4<d<1.6$,
wherein $Ha_d$ is a halogen element represented by Formula 2:

  Formula 2 wherein, in Formula 2, $1.3<e<1.5$, $0<f<0.2$, and $0<g<0.05.$

8. The sulfide solid electrolyte as claimed in claim 7, wherein the sulfide solid electrolyte is a compound represented by Formula 3:

  Formula 3 wherein, in Formula 3, $5.4<a<5.6$, $3.6<b<4.6$, $0<c<1.0$, $1.35<e1<1.45$, $0.1<f1<0.15$, $0<g1<0.02$, and $1.4<e1+f1+g1<1.6$.

9. The sulfide solid electrolyte as claimed in claim 7, wherein the compound represented by Formula 1 is

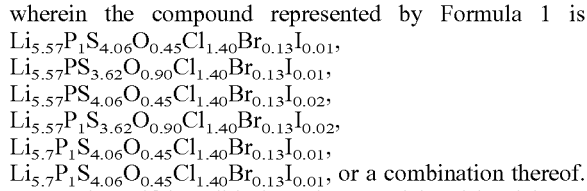

$Li_{5.7}P_1S_{4.06}O_{0.45}Cl_{1.40}Br_{0.13}I_{0.01}$,
$Li_{5.7}P_1S_{4.06}O_{0.45}Cl_{1.40}Br_{0.13}I_{0.01}$, or a combination thereof.

10. The sulfide solid electrolyte as claimed in claim 1, wherein an ionic conductivity of the sulfide solid electrolyte is about 2 mS/cm or higher.

11. The sulfide solid electrolyte as claimed in claim 1, wherein the sulfide solid electrolyte has an ion conductivity retention rate of about 70% or more after 7 days of exposure to the atmosphere.

12. An all-solid secondary battery, comprising:
a cathode layer;
an anode layer; and
a solid electrolyte layer,
wherein at least one of the cathode layer and the solid electrolyte layer includes the sulfide solid electrolyte as claimed in claim 1.

13. The all-solid secondary battery as claimed in claim 12, wherein:
the anode layer includes an anode current collector and a first anode active material layer,
a second anode active material layer is on the first anode active material layer and/or between the anode current collector and the first anode active material layer, and
the second anode active material layer includes lithium or a lithium alloy.

14. The all-solid secondary battery as claimed in claim 12, wherein:
the anode layer includes an anode current collector and a first anode active material layer, and
the all-solid secondary battery further comprises a carbon layer between the first anode active material layer and the solid electrolyte layer.

15. A method of preparing a sulfide solid electrolyte, the method comprising:
preparing a precursor mixture by mixing at least two precursors including lithium, sulfur, phosphorus, oxygen, and halogen atoms; and
heat-treating the precursor mixture at a temperature of about 350° C. or higher to prepare the sulfide solid electrolyte as claimed in claim 1.

16. The method as claimed in claim 15, wherein heat-treating the precursor mixture is performed in a vacuum condition at a temperature of about 500° C. to about 650° C. for about 5 hours or more.

17. The method as claimed in claim 15, wherein preparing the precursor mixture includes mechanically milling the at least two precursors.

* * * * *